United States Patent [19]

Carmody

[11] Patent Number: 5,173,520

[45] Date of Patent: Dec. 22, 1992

[54] COLORANT MATERIAL WITH A POLYMERIZED COATING

[75] Inventor: Walter J. Carmody, Port Jervis, N.Y.

[73] Assignee: Dow Corning Corporation, Midland, Mich.

[21] Appl. No.: 772,177

[22] Filed: Oct. 7, 1991

[51] Int. Cl.$^5$ ................................................. C08K 5/54
[52] U.S. Cl. .................................... 523/205; 524/388; 428/407
[58] Field of Search ......................... 523/205; 524/388; 428/407

[56] References Cited

U.S. PATENT DOCUMENTS

| 2,472,680 | 6/1949 | Pratt | 523/205 |
| 3,734,872 | 5/1973 | Wakimoto et al. | 523/205 |
| 4,169,737 | 10/1979 | Burke, Jr. et al. | 523/201 |
| 4,434,009 | 2/1984 | Banba | 428/407 |
| 5,037,475 | 8/1991 | Chida et al. | 523/205 |
| 5,059,639 | 10/1991 | Ohkura et al. | 523/205 |

Primary Examiner—Paul R. Michl
Assistant Examiner—Andrew E. C. Merriam
Attorney, Agent, or Firm—Jim L. DeCesare

[57] ABSTRACT

A composition which is a colorant material having polymerized on its surface at least one methacrylate monomer. A coating of from about 0.25-2.0 percent by weight based on the weight of the colorant material provides for the improved dispersibility of the coated colorant in various fluids, an improvement in the protection of the color additive from the effects of moisture, and improved anticaking properties.

7 Claims, No Drawings

COLORANT MATERIAL WITH A POLYMERIZED COATING

BACKGROUND OF THE INVENTION

This invention relates to a color additive which possesses (i) improved dispersibility in fluids, (ii) improved protection of the color additive from moisture, and (iii) improved anticaking properties. These improvements are brought about by polymerizing on the surface of the color additive at least one methacrylate monomer.

A colorant or color additive is any material that is a dye, pigment or other substance which is capable of imparting a color to the substance to which it is added. Colorants have been variously categorized as nitro colorants, azo colorants, triphenylmethane colorants, anthraquinone colorants, indigoid colorants, dyes, inorganic pigments, organic pigments, and a series of monographs coined by The Cosmetic, Toiletry and Fragrance Association, Inc. of Washington, D.C.

Such colorants are known to be sensitive to moisture, of varying degrees of difficulty of dispersibility in fluids, and subject to caking. Various colorants therefore suffer from one or more of these disadvantages. The present invention provides a solution to these problems and offers the advantage of a novel colorant material which cakes less, is more resistant to moisture degradation, and which can be dispersed in a relatively shorter period of time, when compared to conventional color additive materials.

SUMMARY OF THE INVENTION

The invention is directed to a composition which is a colorant material having polymerized on its surface at least one organic monomer. The organic monomer can be a polyunsaturated monomer or in an alternative embodiment the organic monomer can be a combination of at least one monounsaturated monomer and at least one polyunsaturated monomer. Preferably the organic monomer is a methacrylate monomer. A coating of from about 0.25-2.0 percent by weight based on the weight of the colorant material has been found to be suitable in achieving the advantages of the present invention.

Accordingly, it is an object of the present invention to provide a coated colorant material in which the time required to disperse the coated colorant in a fluid is reduced by as much as fifty percent in comparison to uncoated colorants. Representative of the various fluids which have been tested are, for example, mineral oil, volatile silicones such as octamethylcyclotetrasiloxane and decamethylcyclopentasiloxane, polydimethylsiloxanes, and propylene glycol.

It is another object of the present invention to provide a coated colorant material which is less sensitive to moisture.

It is further object of the present invention to provide a coated colorant material which is prone to caking less than uncoated colorants.

It is an additional object of the present invention to provide a coated colorant material possessing each of the foregoing advantages without distorting or diminishing the hue of the original colorant sought to be improved.

These and other objects, features and advantages of the present invention will become apparent when considered in light of the following detailed description thereof.

DETAILED DESCRIPTION OF THE INVENTION

The coating on the colorant material can be formed by polymerizing on the surface of the colorant a single polyunsaturated monomer such as ethylene glycol dimethacrylate or tetraethylene glycol dimethacrylate. The coating on the colorant material may also be formed by polymerizing two monomers on the surface of the colorant including at least one polyunsaturated monomer and a monounsaturated monomer such as methyl methacrylate or lauryl methacrylate.

Precipitation polymerization is one method for producing the coated colorant material in accordance with the present invention. In the process there is polymerized, for example, one monounsaturated monomer and one polyunsaturated monomer in the presence of an excess of a volatile organic liquid which is a solvent for the monomers but not for the colorant material or the resulting coated product. Polymerization of the monomers is initiated by means of a free radical generating catalytic compound. A dry coated colorant particulate material is formed by removing the volatile solvent from the product.

The most preferred solvent is isopropyl alcohol although other low molecular weight alcohols such as ethanol may be employed. There can in addition be used low molecular weight alkanes such as heptane and hexane; cycloalkanes such as cyclohexane; and aromatic compounds such as toluene and xylene.

The monounsaturated monomer and the polyunsaturated monomer can be present in varying mole ratios such as 20:80, 30:70, 40:60 or 50:50. The process includes the step of stirring the monomers, solvent, the colorant and the free radical generating catalytic compound during polymerization. The particulate is dried by filtering excess solvent from the particulate and vacuum drying.

Examples of polyunsaturated monomers which may be employed are ethylene glycol dimethacrylate, triethylene glycol dimethacrylate, tetraethylene glycol dimethacrylate, trimethylolpropane ethoxylated triacrylate, ditrimethylolpropane dimethacrylate; propylene, dipropylene and higher propylene glycols; 1,3 butylene glycol dimethacrylate; 1,4 butanediol dimethacrylate; 1,6 hexanediol dimethacrylate, neopentyl glycol dimethacrylate, pentaerythritol dimethacrylate, dipentaerythritol dimethacrylate, bisphenol A dimethacrylate; divinyl and trivinylbenzene; divinyl and trivinyltoluene; triallyl maleate, triallyl phosphate, diallyl maleate, and diallyl itaconate.

Monounsaturated monomers include methacrylates and acrylates having straight or branched chain alkyl groups with 1 to 30 carbon atoms preferably 5 to 18 carbon atoms. Preferred monomers are methyl methacrylate, lauryl methacrylate, 2-ethylhexyl methacrylate, isodecylmethacrylate, stearyl methacrylate, hydroxyethyl methacrylate, hydroxypropyl methacrylate, diacetone acrylamide, phenoxyethyl methacrylate, tetrahydrofurfuryl methacrylate and methoxyethyl methacrylate.

For purposes of the present invention, the term "colorant" or "color additive" is intended to cover materials such as dyes, pigments, and other substances which are known to possess the property of imparting a color to the substance to which the material is added.

Representative of colorant materials in accordance with the present invention are (i) dyes such as azo dyes representative of which is Solvent Yellow 14; azo acid dyes such as Metanil Yellow; anthraquinone dyes such as Solvent Red 111; azine dyes such as induline; and miscellaneous dyes such as Brilliant Sulfoflavin, Acid Yellow 7 and Solvent Orange 60; (ii) inorganic pigments such as titanium dioxide, carbon black, iron oxides, chromium oxide greens, iron blue and chrome green, violet, ultramarine pigments, blue, green, yellow, and brown metal combinations, lead chromates and molybdates, cadmium pigments, titanate pigments, pearlescent pigments, and metallic pigments; (iii) organic pigments such as monazo pigments representative of which is Hansa Yellows, diazo pigments such as Benzidine Yellows, diazo condensation pigments such as Chromophtal, quinacridone pigments such as Pigment Violet 19, vat pigments such as Flavanthrone Yellow, perylene pigments such as Pigment Red 123 R, thioindigo pigments such as Pigment Red 198R, phthalocyanine pigments, tetrachloroisoindolinones, and fluorescent pigments.

Additional colorants are those materials designated by monographs of The Cosmetic, Toiletry and Fragrance Association, Inc. of Washington, D.C., representative of which are (i) FD&C (Primary) such as FD&C Blue No. 1; (ii) FD&C (Lakes) such as FD&C Blue No. 1 Aluminum Lake; (iii) D&C (Primary) such as D&C Orange No. 4; (iv) External D&C (Primary) such as Ext. D&C Violet No. 2; (v) D&C (Lakes) such as D&C Red No. 6; and (vi) External D&C (Lakes) such as Ext. D&C Yellow No. 7.

The invention is further illustrated in more detail in the following examples. Tables I–III are set forth following the examples and show the results of tests conducted in accordance with the various examples.

EXAMPLE I

To a one liter glass resin kettle, equipped with an electrical heating mantle, a paddle-type blade mixer and a nitrogen purge, 490.0 grams of anhydrous isopropyl alcohol and 204.0 grams of red iron oxide was added while mixing. A solution of ethylene glycol dimethacrylate, lauryl methacrylate and benzoyl peroxide initiator, pre-mixed was added to the vessel and mixed. With constant mixing, sufficient enough to suspend the colorant, nitrogen was supplied to the vessel and the batch heated to 65°–70° C. and held at that temperature for 10 hours. During this time the polymer formed, coating the red iron oxide particles with a 10% coating. The batch was cooled and the coated colorant was vacuum filtered. The colorant was air dried by placing the material on a clean glass tray and placed in a dust free cabinet and allowed to dry to constant weight. Results can be found in Table I.

EXAMPLE II

To a two liter glass resin kettle, equipped with an electrical heating mantle, a paddle-type blade mixer and a nitrogen purge, 1047.0 grams of isopropyl alcohol was added and mixed. While mixing, 450.0 grams of red iron oxide, 1.7 grams of ethylene glycol dimethacrylate, 0.57 grams of lauryl methacrylate and benzoyl peroxide initiator were added to the vessel. Nitrogen was added to purge the vessel of oxygen and heat was supplied to the batch. The batch was heated to 70° C. and held for eight hours. During this time polymerization occurred, coating the red iron oxide with a 0.5% coating. The batch was cooled to room temperature, vacuum filtered and the colorant air dried on a glass tray. Results can be found in Table I.

EXAMPLE III

The following was charged to a two liter glass resin kettle, equipped with an electrical heating mantle, paddle-type blade mixer and nitrogen purge: 1049.0 grams of isopropyl alcohol and 450.0 grams of titanium dioxide. The material was mixed until a uniform suspension was obtained. While mixing, and with a nitrogen purge to the vessel, 0.56 grams of ethylene glycol dimethacrylate, 0.56 grams of lauryl methacrylate and benzoyl peroxide initiator was added. The batch was heated to 65°–70° C. and held for eight hours. During this time the polymer formed, coating the colorant with a 0.25% coating. The batch was filtered immediately after the eight hour reaction time. The coated colorant was transferred from the filter to a glass tray and allowed to air dry. Results can be found in Table II.

EXAMPLE IV

To a one liter glass resin kettle, equipped with an electrical heating mantle, paddle-type blade mixer and nitrogen purge, 417 grams of hexane and 280 grams of titanium dioxide were added and mixed. While the batch was being mixed, 2.8 grams of ethylene glycol dimetacrylate and benzoyl peroxide initiator was added. The vessel was purged with nitrogen and heated to 70° C. The temperature was held at 70° C. for ten hours. The batch was allowed to cool overnight. The cooled batch was vacuum filtered and dried in a glass tray. The polymer coating was 1.0% on the colorant. Results can be found in Table II.

EXAMPLE V

Using a two liter glass resin kettle with an electrical heating mantle and paddle-type blade mixer, the following was added: 823.0 grams of ethanol, 675.0 grams of titanium dioxide, 1.7 grams of ethylene glycol dimethacrylate and benzoyl peroxide initiator. The batch was continually mixed to maintain a uniform suspension of the colorant. Nitrogen was supplied to the batch and the batch heated to 65° C. The batch was held at temperature for ten hours. The material was cooled, vacuum filtered, placed on a glass tray and dried in a 50° C. oven. The colorant produced had a 0.25% polymer coating. Results can be found in Table II.

EXAMPLE VI

Example V was repeated, except FD&C Blue #1 Aluminum Lake was used as the colorant to be coated. Tetraethylene glycol dimethacrylate was substituted for ethylene glycol dimethacrylate. The benzoyl peroxide initiator was replaced by 2,2-azobis (2,4-dimethylpentane nitrile) available commercially as VAZO 52 from E.I. DuPont de Nemours & Co. Inc., Wilmington, Del. U.S.A. Results can be found in Table III.

EXAMPLE VII

Example III was repeated with FD&C Blue #1 Aluminum Lake being substituted for titanium dioxide, methanol substituted for isopropanol and methyl methacrylate substituted for lauryl methacrylate. The benzoyl peroxide initiator was replaced by 2,2-azobis (2,4-dimethylpentane nitrile) available commercially as VAZO 52 from E.I. DuPont de Nemours & Co. Inc., Wilmington, Del. U.S.A. Results can be found in Table III.

The evaluation procedures shown in Tables I-III are set forth hereinbelow:

A. Anti-caking

A 5 gram sample, uncoated and coated, was placed on a 20 mesh screen. The screen was lightly shaken to sift the powder through the screen. The material remaining on the screen after two minutes was weighed and the percent which passed through the screen was determined.

B. Moisture Barrier

One gram samples of the uncoated and coated colorant were placed in a pre-weighed petri dish. The open dishes were placed in a 35% relative humidity chamber. The chamber was sealed except when the samples were removed, analyzed and returned to the chamber. Moisture gain was determined by analyzing a 0.05 gram sample by the standard Karl Fisher Method.

C. Dispersion Ability

Dispersion ability of the colorant was determined by the colorant rate of dispersion, to a uniform mixture, in common cosmetic fluids. 200.0 grams of each fluid, light mineral oil, a volatile silicone, polydimethylsiloxane 50 centistokes and propylene glycol was placed in a 250 ml Pyrex beaker. The fluid was mixed with a two inch half circle Teflon blade attached to a glass shaft. The mixer was a Lightning Lab mixer set at 800 rpm. One gram of each colorant, uncoated and coated, was added to the mixing fluid. The time to totally disperse the colorant in the fluid was determined from the start of the addition until a uniform mixture was observed.

TABLE I

| Colorant: Red Iron Oxide | | | |
|---|---|---|---|
| | | Percent Coating | |
| | Uncoated | 0.50% | 1.00% |
| Monomer(s) | — | EGDM/LMa* | EGDM/LMA |
| Monomers mole ratio | | 3/1 | 3/1 |
| A) Anti Caking | | | |
| % through 20 mesh | 98.0 | 99.5 | 100.0 |
| B) Moisture Gain, % | | | |
| 1 day | .003 | .004 | .002 |
| 5 days | .010 | .009 | .008 |
| 10 days | .042 | .010 | .010 |
| 20 days | .750 | .012 | .010 |
| C) Dispersability, minutes | | | |
| Mineral oil | 3.50 | 2.75 | 2.75 |
| Volatile silicone | 2.75 | 2.25 | 2.00 |
| Polydimethylsiloxane 50 cs | 3.75 | 3.00 | 3.00 |
| Propylene Glycol | 4.00 | 3.25 | 2.25 |

*= EGDM is ethylene glycol dimethacrylate
LMA is lauryl methacrylate

TABLE II

| Colorant: Titanium Dioxide | | | | |
|---|---|---|---|---|
| | | Percent Coating | | |
| | Uncoated | 0.25% | 0.25% | 1.00% |
| Monomer(s) | — | EGDM | EGDM/LMA | EGDM |
| Monomers mole ratio | | | 1/1 | — |
| A) Anti Caking | | | | |
| % through 20 mesh | 99.7 | 100 | 100 | 100 |
| B) Moisture Gain, % | | | | |
| 1 day | .000 | .000 | .000 | .000 |
| 5 days | .001 | .000 | .000 | .000 |
| 10 days | .001 | .000 | .000 | .000 |
| 20 days | .004 | .000 | .000 | .000 |
| C) Dispersability, minutes | | | | |
| Mineral oil | 3.50 | 1.5 | 1.75 | 1.25 |
| Volatile silicone | 2.75 | 1.5 | 1.00 | 1.00 |
| Polydimethylsiloxane 50 cs | 3.50 | 2.00 | 2.25 | 2.00 |
| Propylene Glycol | 4.00 | 2.00 | 2.00 | 1.75 |

TABLE III

| Colorant: Titanium Dioxide | | | |
|---|---|---|---|
| | | Percent Coating | |
| | Uncoated | 0.25% | 0.25 |
| Monomer(s) | — | TEGDM* | EGDM/MM* |
| Monomers mole ratio | | — | 1/1 |
| A) Anti Caking | | | |
| % through 20 mesh | 99.2 | 99.8 | 99.9 |
| B) Moisture Gain, % | | | |
| 1 day | .001 | .000 | .000 |
| 5 days | .007 | .003 | .004 |
| 10 days | .014 | .005 | .009 |
| 20 days | .038 | .010 | .012 |
| C) Dispersability, minutes | | | |
| Mineral oil | 1.50 | 0.75 | 0.50 |
| Volatile silicone Dow Corning 345 fluid | 1.00 | 0.50 | 0.50 |
| Polydimethylsiloxane Dow Corning 200 fluid, 50 cs | 1.25 | 1.00 | 0.75 |
| Propylene Glycol | 2.00 | 1.00 | 1.00 |

*= TEGM is tetraethylene glycol dimethacrylate
MM is methyl methacrylate

It will be apparent from the foregoing that many other variations and modifications may be made in the compositions described herein without departing substantially from the essential features and concepts of the present invention. Accordingly, it should be clearly understood that the forms of the invention described herein are exemplary only and are not intended as limitations of the scope on the present invention.

That which is claimed is:

1. A dispersion comprising a mixture of a volatile silicone fluid selected from the group consisting of octamethylcyclotetrasiloxane and decamethylcyclopentasiloxane, and a coated colorant material, the coated colorant material being a colorant material having polymerized on its surface at least one polyunsaturated methacrylate monomer in the form of a coating of from about 0.25-2.0 percent by weight based on the weight of the colorant material.

2. A dispersion according to claim 1 in which the volatile silicone fluid is octamethylcyclotetrasiloxane.

3. A dispersion according to claim 1 in which the volatile silicone fluid is decamethylcyclopentasiloxane.

4. A dispersion according to claim 1 in which the polyunsaturated methacrylate monomer is ethylene glycol dimethacrylate.

5. A dispersion according to claim 1 in which the polyunsaturated methacrylate monomer is tetraethylene glycol dimethacrylate.

6. A dispersion according to claim 4 including a monounsaturated methacrylate monomer which is methyl methacrylate.

7. A dispersion according to claim 4 including a monounsaturated methacrylate monomer which is lauryl methacrylate.

* * * * *